CRYOGENIC RING CIRCUIT

Filed Dec. 27, 1957

INVENTOR.
ANDREW E. BRENNEMANN
BY
Brumbaugh, Free, Graves & Donohue
his ATTORNEYS.

United States Patent Office 3,098,159

Patented July 16, 1963

3,098,159

CRYOGENIC RING CIRCUIT

Andrew E. Brennemann, Poughkeepsie, N.Y., assignor to International Business Machines Corporation, New York, N.Y., a corporation of New York Filed Dec. 27, 1957, Ser. No. 705,553
1 Claim. (Cl. 307—88.5)

This invention, generally, relates to ring-type circuitry and, more particularly, to a new and improved ring-type circuit which eliminates the heretofore required "intermediate" or "delay" stage.

In previously known ring circuits, it has not been possible to "set" a succeeding sense stage with the same current pulse which "resets" a selected sense stage. It has been necessary in the past to provide either a delay unit between stages or an intermediate stage to receive the stored information when a stage is reset, and then the information is transferred to the next succeeding sense stage from this intermediate stage in order for it to be read out. There are many disadvantages inherent in such ring circuits among which are the relative slowness in operation and the more complicated circuitry required.

Accordingly, it is an object of this invention to provide a ring-type circuit wherein each stage is useful to read out information.

A further object of this invention is to provide a new and improved ring circuit which eliminates the need for an intermediate or delay stage.

A still further object of the invention is to provide a ring circuit wherein the number of outputs is equal to the number of stages.

It is also an object of this invention to provide a ring-type circuit which is adaptable for employing superconductive elements as operative circuit components.

Generally, the invention includes in one of its forms a provision for coupling the sense or output circuit with two adjacent stages. In this manner, an output is obtained only when both coupled stages are turned "on." As alternate stages are pulsed, the output is shifted in step fashion through the ring by the unique interconnected relationships of the various circuit components which will be described in greater detail hereinafter.

Other objects and advantages of the invention will be pointed out in the following description and illustrated in the accompanying drawings, which disclose, by way of example, the principle of the invention and the best mode, which has been contemplated, of applying that principle.

Although the principles of the invention are applicable to ring circuits employing various diverse circuit components such as, for example, magnetic memory devices, a circuit employing superconductive components is selected for the purposes of the following detailed description, it being understood that the invention is not limited to this selection.

Figure 1:
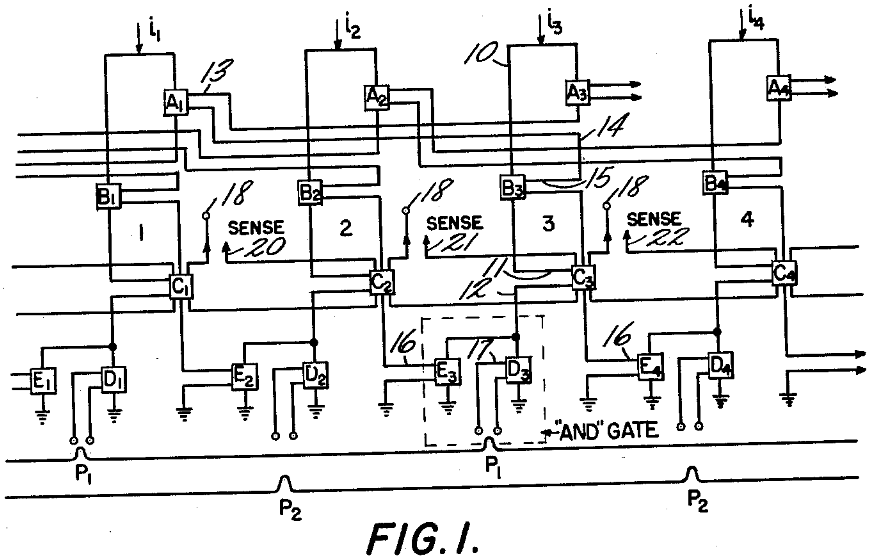
FIGURE 1 shows diagrammatically a circuit embodying the principles of the invention.

In the illustrative embodiment of the invention as shown in FIGURE 1 of the drawings, the letters A, B, C, D, and E identify, respectively, five cryotrons representing operative components in the circuit. Each of the cryotrons is represented diagrammatically by a square in the drawings to indicate further, as mentioned above, that other circuit components may be substituted for the cryotron elements. However, since the circuit selected for illustration purposes is operative on the superconductive phenomenon, all of the leads, conductors, connections and cryotron gates are formed of materials capable of exhibiting superconductive characteristics. Each of the cryotrons includes at least one gate element of superconductor material maintained at a temperature at which it is superconductive in the absence of a magnetic field, and at least one control element which is arranged to apply magnetic fields to the gate element(s). The cryotrons may be of the wire type shown in an article by D. A. Buck which appeared in the Proceedings of the IRE for April 1956, pp. 482–493, or of the film types shown in copending application Serial No. 625,512, filed November 30, 1950, in behalf of R. L. Garwin and assigned to the assignee of this application. In accordance with the schematic representation employed in FIGURE 1, the vertical leads connected to each of the cryotrons represented by squares A, B, C, D and E are connected to the gate elements for these cryotrons and the horizontal leads are connected to the control elements. Thus, for example, the cryotron represented by square $C_3$ actually includes three individual gate elements under the control of a single control element, or possibly three series connected control elements, connected between the leads 11 and 12. The various connections and relative relationships of the components will be better understood from the following detailed description of the illustrated circuit.

In FIGURE 1, four stages of a ring circuit are shown, each stage being substantially identical and similar elements being represented by the same numeral. Currents $i_1$ $i_2$, $i_3$, and $i_4$, supplied from separate current sources, are shown connected to the stages 1–4, respectively. In stage 3, for example, the current $i_3$ is connected to flow in either of two parallel paths. One path is through the lead 10, the gate $B_3$, the winding 11 positioned in inductive relation with the gate $C_3$, the lead 12 to the parallel-connected gates $D_3$ and $E_3$. Alternatively, the current $i_3$ may flow through the path including the gate $A_3$, the winding 13 positioned in inductive relation with the gate $A_1$, the lead 14, the winding 15 placed in inductive relation with the gate $B_3$, the gate $C_3$, and the winding 16 positioned in inductive relation with the gate $E_4$.

The D and E gates, in combination, form an "AND" gate. However, the invention is not limited to the separate gates D and E, and "AND" gate as shown in FIGURE 3 being equally adaptable for this purpose, for example.

Figure 3:
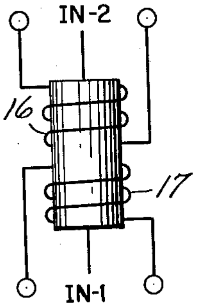
FIGURE 3 is a diagrammatic representation of an "AND" gate which may be substituted for the "AND" gates shown in FIGURE 1.

In FIGURE 3 the two windings 16 and 17 are shown to be separately wound around the cryotron gate, though the windings are actually arranged so that the fields they apply are essentially superimposed. In operation, each winding is effective, when energized, to apply to the gate a magnetic field which is, of itself, insufficient to drive the gate into a resistive state, but which together with that applied by the other winding, when coincidentally energized, is sufficient to drive the gate resistive. A winding 17 is positioned in inductive relation with the gate $D_3$ and is adapted to receive input pulses identified by the letter $P_1$. The winding 16 on the gate $E_3$ is energized by the current $i_2$ when the stage 2 is "on."

As previously stated, an output is obtained by sensing two stages simultaneously. In the circuit shown in FIGURE 1, all of the terminals designated by the numeral 18 are connected together to a common source of electric current and the output is obtained at one of the terminals designated 20, 21 or 22. For an output to be sensed at, for example, the terminal 21, both the gates $C_2$ and $C_3$ must be superconductive which represents the "on" state for each of these stages. An output is sensed at the terminal 21 in this instance because the circuit loop from the common terminal 18 to the sense terminal 21 is coupled by the winding 11 on each of these gates $C_2$ and $C_3$, and there is no current flow through a winding 11 when a stage is "on." A more complete understanding of the ring circuit may be had from the following detailed description of its operation.

Figure 2:
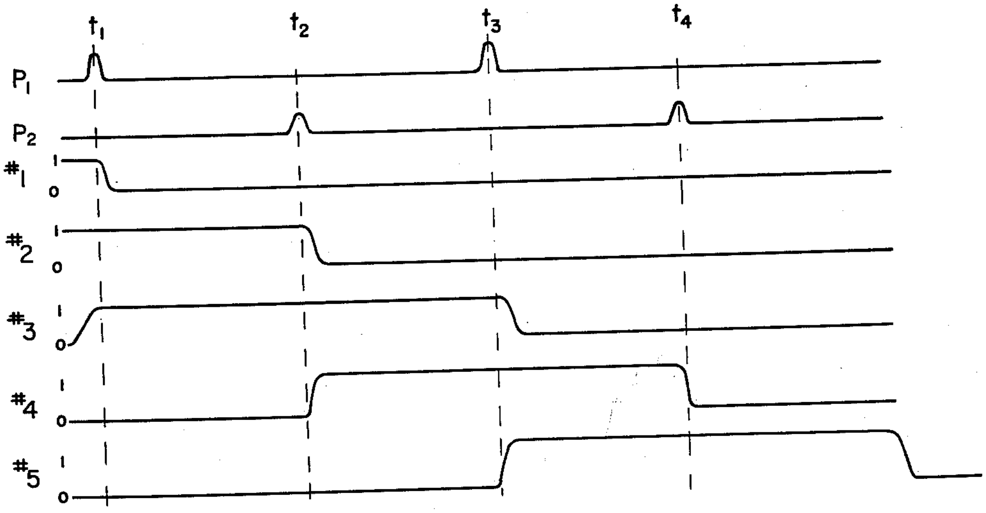
FIGURE 2 is a timing chart showing the relative operative relationship of the various electric currents in the circuit shown in FIGURE 1.

Referring to FIGURE 2 of the drawings, the first two lines of the timing chart show the relative timing of the control pulses $P_1$ and $P_2$ which are applied to alternate and intermediate stages, respectively. The remaining five curves show the states of the currents $i_1$, $i_2$, $i_3$ and $i_4$ for the four stages shown in FIGURE 1 and the state for a fifth stage, not shown.

Assume initially that the stages 1 and 2 are "on" or in a one state and the stages 3 and 4 are "off" or in a zero state. This means that the currents $i_1$ and $i_2$ are flowing through the gates $C_1$ and $C_2$, respectively, and that the currents $i_3$ and $i_4$ are flowing through the gates $B_3$ and $B_4$, respectively. Now, the pulse $P_1$ is applied to the winding 17 on the gates $D_1$ and $D_3$, respectively, and the magnetic effect of the windings 17 renders the cryotron gates $D_1$ and $D_3$ resistive. However, since stage 1 is already "on," there is no current flow through the gate $D_1$ so that the only effect of the pulse $P_1$ is to make the gate $D_1$ resistive. However, the stage 3 is "off" and, therefore, the current $i_3$ flowing through the gate $B_3$ and the winding 11 is reduced, thereby increasing the current flow through the gate $A_3$. The increased current flow through the gate $A_3$ develops a magnetic field in the winding 13 on the gate $A_1$ causing more current $i_1$ to flow through the gate $B_1$, the winding 11 on the gate $C_1$, and the gate $E_1$ to further reduce the current through the gate $A_1$ until all of the current $i_1$ flows through the gate $B_1$ and $E_1$ to ground. The result is that the stage 1 is turned "off."

As the current $i_3$ increases through the gate $A_3$, the gate $B_3$ is driven further resistive to decrease the magnetic effect of the winding 11 on the gate $C_3$. Thus, the current $i_3$ is shifted from the path of the gate $B_3$ to the gate $A_3$ path and the stage 3 is now turned "on." With both the gates $C_2$ and $C_3$ superconductive, the sense current from the common terminal 18 will now be detected at the terminal 21 rather than, as previously, at the terminal 20. Now, with the appearance of the pulse $P_2$, the stage 2 may be turned "off" and the stage 4 may be turned "on" to further shift the sense output to the terminal 22. In this manner, the information is shifted through the ring circuit.

It is to be understood that the above-described arrangements are simply illustrative of the application of the principles of the invention. Numerous other arrangements may be readily devised by those skilled in the art which will embody the principles of the invention and fall within the spirit and scope thereof.

I claim:

A ring circuit having a plurality of stages, each stage comprising first and second parallel current paths, first and second cryotrons connected in series with said first current path, third and fourth cryotrons connected in series with said second current path, a first winding means connected in series with said first current path and positioned in magnetic field applying relation with a cryotron in said second parallel current path, an "AND" gate connected in series with said first parallel current path, said "AND" gate being operable by coincident currents from a preceding stage and a control current pulse, second and third winding means connected in series with said second parallel current path, said second winding means being positioned in magnetic field applying relation with a cryotron in the second parallel current path of a preceding stage, said third winding means being positioned in magnetic field applying relation with the "AND" gate of the next succeeding stage, and output terminal means connected in series through the first winding means of two adjacent stages such that an output will be sensed only when said first winding means of two adjacent stages are deenergized.

References Cited in the file of this patent

UNITED STATES PATENTS

| | | |
|---|---|---|
| 2,416,095 | Gulden | Feb. 18, 1947 |
| 2,591,406 | Carter et al. | Apr. 1, 1952 |
| 2,969,469 | Richards | Jan. 24, 1961 |

OTHER REFERENCES

"Static Magnetic Memory," by Kincaid, Alden and Hanna, Electronics, January 1951, pp. 108–111.

"The Cryotron—a Superconductive Computer Component," Proceedings of the IRE, April 1956, pp. 482–496.